(12) United States Patent
Stanfill

(10) Patent No.: US 9,413,542 B2
(45) Date of Patent: Aug. 9, 2016

(54) MANAGING DATA FEEDS

(71) Applicant: Ab Initio Technology LLC, Lexington, MA (US)

(72) Inventor: Craig W. Stanfill, Lincoln, MA (US)

(73) Assignee: Ab Initio Technology LLC, Lexington, MA (US)

( * ) Notice: Subject to any disclaimer, the term of this patent is extended or adjusted under 35 U.S.C. 154(b) by 126 days.

(21) Appl. No.: 14/453,752

(22) Filed: Aug. 7, 2014

(65) Prior Publication Data

US 2015/0043579 A1 Feb. 12, 2015

Related U.S. Application Data

(60) Provisional application No. 61/863,062, filed on Aug. 7, 2013.

(51) Int. Cl.
*H04L 12/28* (2006.01)
*H04L 12/18* (2006.01)
*H04L 12/761* (2013.01)

(52) U.S. Cl.
CPC ........ *H04L 12/1863* (2013.01); *H04L 12/1868* (2013.01); *H04L 45/16* (2013.01)

(58) Field of Classification Search
CPC combination set(s) only.
See application file for complete search history.

(56) References Cited

U.S. PATENT DOCUMENTS

| 2007/0140242 | A1* | 6/2007 | DiGiorgio | H04L 12/1863 370/390 |
| 2007/0300234 | A1 | 12/2007 | Dekel et al. | |
| 2008/0112440 | A1* | 5/2008 | Bedekar | H04W 56/0045 370/519 |
| 2008/0259844 | A1* | 10/2008 | Richeson | H04M 11/002 370/328 |
| 2012/0036394 | A1 | 2/2012 | Feng | |
| 2012/0257492 | A1 | 10/2012 | Henry et al. | |

OTHER PUBLICATIONS

Akidau et al., "MillWheel: Fault-Tolerant Stream Processing at Internet Scale," In Proceedings of the 39th International Conference on Very Large Data Bases (VLDB), 12 pages (2013).
Stonebraker et al., "The 8 Requirements of Real-Time Stream Processing," ACM SIGMOD Record, vol. 34, Issue 4, pp. 42-47 (Dec. 2005).
Baker et al., "Megastore: Providing Scalable, Highly Available Storage for Interactive Services," Conference on Innovative Database Research, 12 pages (2011).
Busjaeger et al., "Scalable Transaction Processing for Cloud Datastores through Optimized Partitioning," 9 pages (Apr. 3, 2012) [retrieved from internet: https://wiki.cites.illinois.edu/wiki/display/cs598rco/RainCloud, (Progress Report) through downloaded May 30, 2014].

(Continued)

*Primary Examiner* — Bob Phunkulh
(74) *Attorney, Agent, or Firm* — Occhiuti & Rohlicek LLP

(57) ABSTRACT

Managing data units broadcast from a data feed, without requiring re-transmission by a source of the data feed, includes: at a first node in a network, receiving at least a portion of a data feed including a plurality of data units; at a second node in the network, receiving at least a portion of the data feed; identifying an interruption in receiving the data feed at the first node; determining an extent of a data lacuna extending between a last data unit received by the first node prior to the interruption and a first data unit received by the first node after the interruption; and sending a request from the first node for results saved by the second node, the results saved by the second node corresponding to the data lacuna.

40 Claims, 4 Drawing Sheets

(56) References Cited

OTHER PUBLICATIONS

Busjaeger at al., "Troups: Scalable Transactions for BigTable datastores," 10 pages (May 9, 2012) [retrieved from internet: https://wiki.cites.illinois.edu/wiki/display/cs598rco/RainCioud, (Final Paper) downloaded May 30, 2014].

International Search Report and Written Opinion, PCT Application No. PCT/US2014/050038, mailed Nov. 10, 2014 (9 pages).

\* cited by examiner

MANAGING DATA FEEDS

CROSS-REFERENCE TO RELATED APPLICATION

This application claims priority to U.S. application Ser. No. 61/863,062, entitled "MANAGING DATA FEEDS," filed on Aug. 7, 2013, incorporated herein by reference.

BACKGROUND

This description relates to managing data feeds.

A data feed provides a set of data units that have a well-defined order and are transmitted sequentially in that order on a substantially regular basis. The data units may be transmitted over a network such that the data units are broadcast to multiple nodes in the network. Certain data sources output real-time broadcast data feeds of ordered data units. An example of such a real-time broadcast data feed is a time series. This data feed might contain, for example, the price of a commodity at successive times.

A node in a network can capture a data feed and store it so that when a client needs a selected portion of the data, the node can retrieve it from storage and provide it to the client. There may be certain requirements that the node must satisfy when managing the captured data. For example, one set of requirements is that the data be available all the time, and that no data be lost.

A difficulty that arises is that a node may fail to capture and store some of the data feed. When this happens to a real-time broadcast data feed from a data source that is configured to only broadcast the data feed in real-time (i.e., without re-transmission), the missing data is lost forever to that node and its clients.

This failure can happen, for example, either because the node temporarily loses its network connection, or because the node becomes inoperative or runs out of buffer capacity. When this happens, the node may fail to capture and store some of the data in the data feed. Therefore, when a client asks the node for a particular portion of the data feed, if that portion happens to span a time during which the node was unable to capture and store data from the data feed, the node will be unable to fulfill the request.

SUMMARY

In one aspect, in general, a method is provided for receiving data units (e.g., a complete set of data units) of an interrupted data feed from a source, without requiring re-transmission from the source. The data feed is being sent to multiple nodes in a network. Each node includes a processing module coupled to: a network interface for receiving data units of at least a portion of the data feed, and a data store for saving results corresponding to the data units received at that node. A first node captures an incomplete copy of the data feed missing one or more data units, and identifies a gap between two received data units. The first node determines the extent of the gap and sends a request for data units corresponding to the gap.

In another aspect, in general, a method for managing data units broadcast from a data feed without requiring re-transmission by a source of the data feed. The method includes: at a first node in a network, receiving at least a portion of a data feed including a plurality of data units; at a second node in the network, receiving at least a portion of the data feed; identifying an interruption in receiving the data feed at the first node; determining an extent of a data lacuna extending between a last data unit received by the first node prior to the interruption and a first data unit received by the first node after the interruption; and sending a request from the first node for results saved by the second node, the results saved by the second node corresponding to the data lacuna.

Aspects can have one or more of the following features.

The method further includes, prior to identifying the interruption, processing data units in the data feed at the first node to save results corresponding to the data units at the first node, and processing data units in the data feed at the second node to save results corresponding to the data units at the second node.

Processing a data unit to save a result corresponding to the data unit includes durably storing a representation of the data unit.

The representation of the first data unit is an exact copy of the first data unit.

The representation of the first data unit is a compressed representation of the first data unit.

The method further includes, at the first node, receiving the results saved by the second node corresponding to the data lacuna, and saving the results at the first node.

The method further includes: at the first node, saving a first result based on a first data unit from the data feed at the first node, at the second node, saving results based on data from the data feed at the second node, the results including the first result, a second result, and a third result, the second result being based on a second data unit, and the third result being based on a third data unit, wherein the second data unit is received after the first data unit and before the third data unit. Determining an extent of a data lacuna includes: at the first node, after the interruption, receiving the third data unit, at the first node, identifying that the first data unit is the last data unit received prior to the interruption, and at the first node, identifying existence of a data lacuna extending between the first data unit and the third data unit.

The method further includes, at the first node, receiving the results saved by the second node corresponding to the data lacuna, and saving the results, including the second result, at the first node.

The method further includes, prior to sending a request from the first node, selecting the second node from among a plurality of nodes, all of which are being streamed the data feed.

The method further includes receiving a request from a client in communication with the first node.

The request from the client identifies one or more data units associated with the request.

The method further includes sending the request from the first node for results saved by the second node in response to determining that at least one of the data units identified by the request from the client is in the data lacuna.

The method further includes, after receiving the results saved by the second node, responding to the request from the client.

The method further includes responding to the request from the client to redirect the request to the second node.

In another aspect, in general, software is stored in a non-transitory form on a computer-readable medium, for managing data units broadcast from a data feed without requiring re-transmission by a source of the data feed. The software includes instructions for: causing a first node in a network to receive at least a portion of a data feed including a plurality of data units; causing a second node in the network to receive the data feed; causing the first node to identify an interruption in receiving the data feed; causing the first node to determine an extent of a data lacuna extending between a last data unit received by the first node prior to the interruption and a first data unit received by the first node after the interruption; and causing the first node to send, to the second node that has also been receiving at least a portion of the data feed, a request for results saved by the second node, the results saved by the second node corresponding to the data lacuna.

In another aspect, in general, a system for managing data units broadcast from a data feed without requiring re-transmission by a source of the data feed includes a plurality of nodes. At least a first node and a second node each include: a network interface configured to receive at least a portion of a data feed including a plurality of data units, and at least one processor configured to process the data feed. The processing includes: identifying an interruption in receiving the data feed, determining an extent of a data lacuna extending between a last data unit received by the node prior to the interruption and a first data unit received by the node after the interruption, and sending a request to an other node for results saved by the other node, the results saved by the other node corresponding to the data lacuna.

In another aspect, in general, a system for managing data units broadcast from a data feed without requiring re-transmission by a source of the data feed includes a plurality of nodes. At least a first node and a second node each include: means for receiving at least a portion of a data feed including a plurality of data units, and means for processing the data feed, the processing including: identifying an interruption in receiving the data feed, determining an extent of a data lacuna extending between a last data unit received by the node prior to the interruption and a first data unit received by the node after the interruption, and sending a request to an other node for results saved by the other node, the results saved by the other node corresponding to the data lacuna.

Aspects can include one or more of the following advantages.

One way to reduce the probability of irrecoverably losing data from a data feed is to provide multiple receiving nodes, each of which concurrently receives and when all is working as planned, captures the data. A node that fails to capture a portion of the data and thus cannot supply a requested portion of data to a client can then redirect the client to another node. Of course, it is possible that that node will also be unable to provide the requested portion of data, but the more nodes there are to receive the data, the less likely the data will not be captured by any of them. In the long run, it is likely that each node will eventually experience some failure that causes missing data. Therefore, if no further steps are taken, eventually it is likely no single node will have a complete set of data from the current time all the way back to some arbitrarily earlier start time. Using the techniques described herein, it is possible, though, to promptly detect when data is missing, and precisely identify the missing data. This ability then can be used to provide a self-healing system of nodes in which each node detects data lacuna in its data set and makes requests to other nodes for the data required to fill in the data lacuna with the missing data.

Other features and advantages of the invention will become apparent from the following description, and from the claims.

DESCRIPTION

Figure 2:
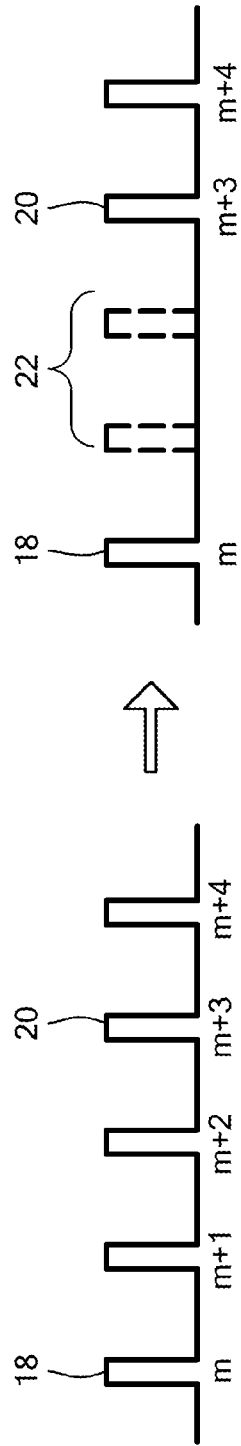
FIG. 2 shows time plots of a transmitted real-time broadcast data feed and a corresponding stored data feed with a data lacuna.

A system for management of data includes a plurality of nodes 10A, 10B ... 10Z connected to a network 12. In normal operation, each of the nodes 10A, 10B ... 10Z concurrently receives a data feed 14 over a respective corresponding connection 14A, 14B ... 14Z to the network 12 over which the data feed 14 is available. This data feed 14 includes a set of sequentially transmitted data units, as shown in FIG. 2, having the property that given any two data units 18, 20, it is possible to identify a data lacuna 22 between the two data units 18, 20. In the context of such a data feed 14, a "data lacuna" corresponds to a lacuna (i.e., an unfilled space or interval) between the two data units that is identifiable in some known way, such as, for example, based on a gap in a series of implicit or explicit identifiers for the data units.

An example of such a data feed 14 would be a feed of data units, each of which is tagged with a sequence number or time stamp. In the case of integral sequence numbers that increment by 1, if one receives data unit m and the next following received data unit is data unit m+k, one can determine not only that there must be k−1 missing data units, but also that they must have been data units m+1 through m+k−1. Other cases include those in which data units are expected at regular intervals of time, in which case given two data units and their associated times (e.g., from associated time stamps), a node can compute the extent of a data lacuna 22 based on the known regular intervals of time at which data units are expected.

Figure 3:
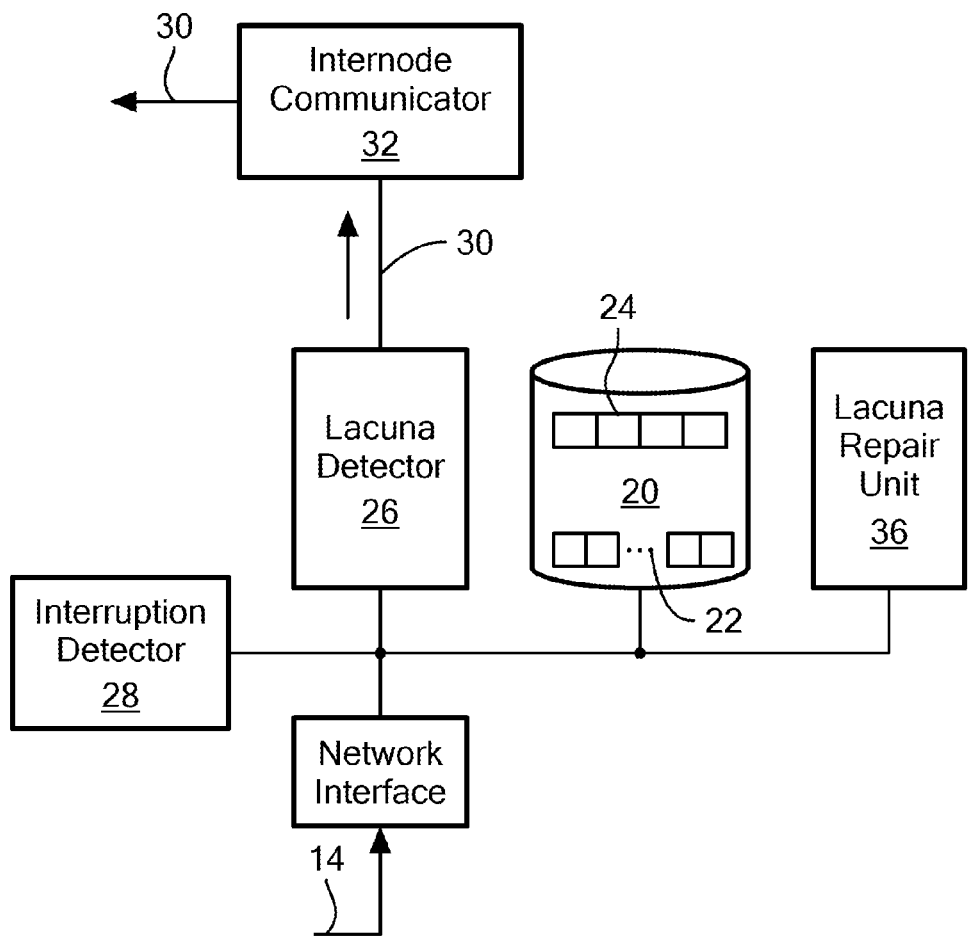
FIG. 3 is a block diagram of the structure of a typical node from the set of nodes shown in FIG. 1.

An example of a node in a network, such as the nodes 10A, 10B ... 10Z, is a computing system, such as a server, under the control of processing circuitry, which could be a central processing units (CPUs) (possibly with multiple processor cores), a processor core in a CPU, or an FPGA or other programmable or dedicated logic. The processing circuitry includes a network interface for communicating over the network, potentially via an intermediate network (e.g., a local area network (LAN) and/or wide-area network (WAN)). Referring now to FIG. 3, in this example, the node 10A includes, or is coupled to, a data storage 20 in which a set of transmitted data units from the data feed 14 is stored as a set of stored data units 24. If the data storage 20 is configured to durably store data units, then it enables the data units 24 to be retrieved at a later time even if there is a disruption in operation of the node 10A (such as a loss of power), as provided, for example, by a data storage 20 that uses a non-volatile storage medium. In some cases, the set of stored data units 24 is a copy of the set of transmitted data units from the data feed 14. However, in other cases, the set of stored data units 24 contains processed versions of transmitted data units from the data feed 14. For example, a stored data unit may be a compressed version of the transmitted data unit, or may have certain relevant values extracted and/or certain overhead information stripped away.

It is possible that the set of stored data units 24 may not match the set of transmitted data units. This can happen, for example, if the node 10A stops working, for example due to a power outage, or if a network connection is interrupted. This results in the creation of one or more data lacunas 22 in the set of stored data units 24.

To detect the existence of such data lacunas 22, a lacuna detector 26 inspects the set of stored data units 24. It does so in any manner reasonably calculated, based on knowledge of the characteristics of the data transmission, to detect data lacunas. For example, it may inspect the set of stored data units either at regular intervals, or in response to detecting an interruption from an interruption detector 28.

Figure 1:
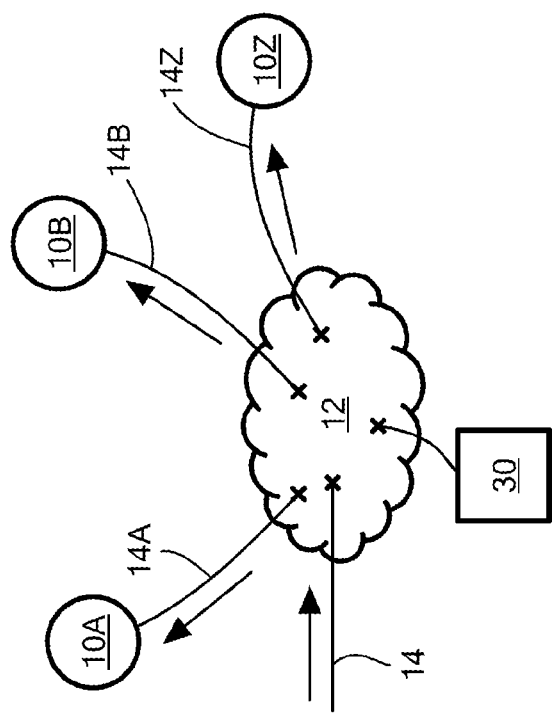
FIG. 1 is a network diagram of a set of nodes concurrently receiving a common real-time broadcast data feed.

In other cases, a client 30, shown in FIG. 1, may request certain data. The client 30 may be another node in the network 12, or may be a device or system (e.g., a user's computer system or terminal) that is able to communicate with any of the nodes in the network 12 through messages even if the client does not have a regular connection to the network 12. The client 30 may select a particular node 10A from which to request data based on a geographical proximity or current load, for example. It may happen that the data requested spans a data lacuna. In such cases, the client's request triggers the lacuna detector 26 to inspect data being requested by the client 30 to confirm that there is no data lacuna 22 in the requested data. If there is at least one data lacuna 22 in the requested data, the node 10A requests saved results corresponding to the data units in the data lacuna 22 from a second node 10B in the network 12, as described in more detail below. The node 10A may respond to the client's request after the data lacuna 22 is repaired, or may redirect the client's request to another node in the network 12 while the data lacuna 22 at that node 10A is being repaired.

Upon detecting a data lacuna, the lacuna detector 26 formulates a request 30 to be provided to an internode communicator 32. The request 30 includes a specification of any detected data lacunas 22. The internode communicator 32 then transmits the request to the second node 10B. That second node 10B may or may not have a set of stored data units that includes data units that were omitted as a result of the interruption. If the second node 10B has the required data, it transmits it back to the first node 10A. Otherwise, it retransmits the request to a third node 10C, which again may or may not have the required data. This procedure continues until eventually a node has the required data.

In some cases, the second node 10B may have some but not all of the required data. In that case, the second node 10B sends what it has to the first node 10A, and formulates a message to a third node 10C for the remainder, with instructions to transmit the remainder to the first node 10A if the remainder is available at the third node 10C. This procedure continues until eventually all the missing data is obtained.

In principle it is possible that the missing data cannot be found in the entire set of nodes 10A-10Z, in which case the node 10A would report an error to the client 30. However, this should be a very low probability event.

Figure 4:
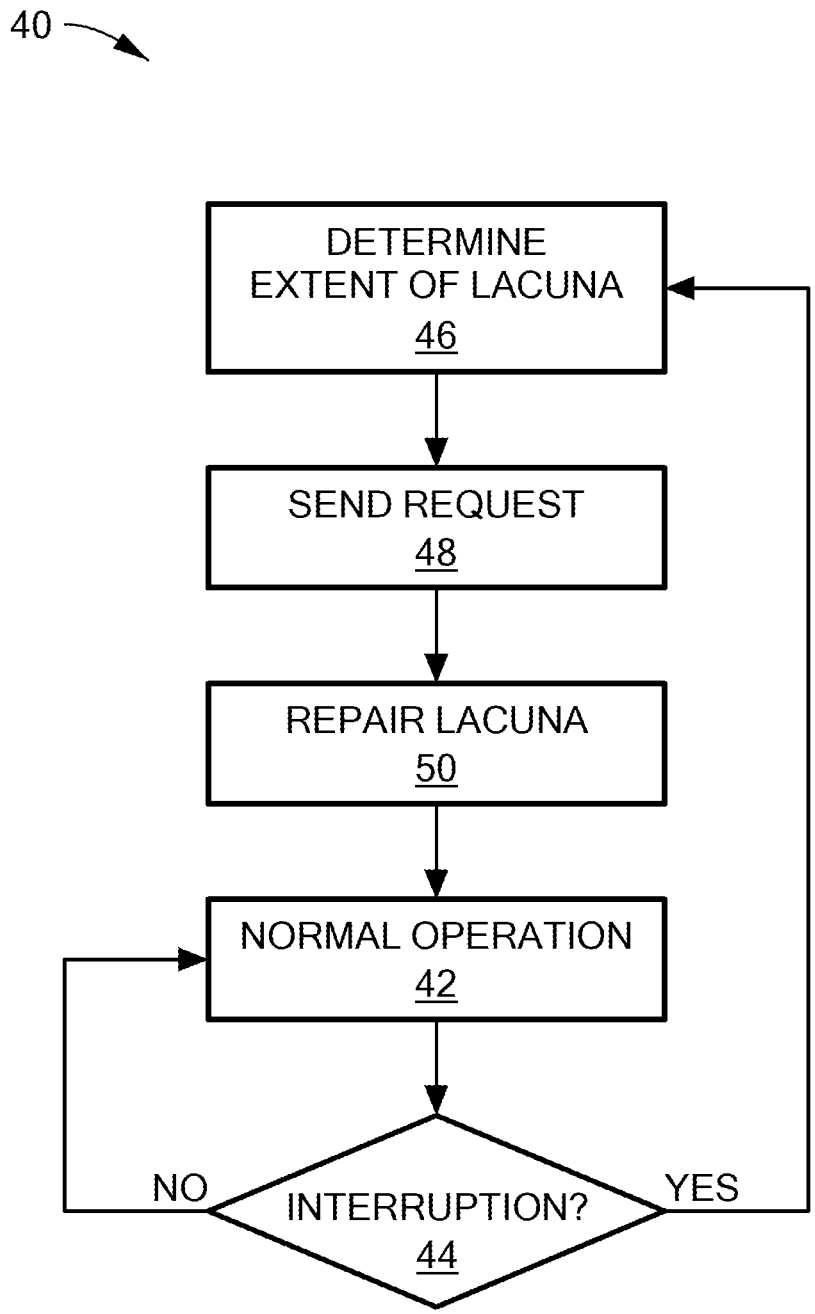
FIG. 4 is a flowchart for a method executed by a particular node in the set of nodes shown in FIG. 1.

Referring to FIG. 4, which shows a flowchart 40 of an example of a procedure for managing data feeds. During normal operation (42) the node 10A receives a data feed and responds to client requests. In response to identifying (44) an interruption in receiving the data feed, the node 10A performs a lacuna repair procedure. The lacuna detector 26 determines (46) the extent of a data lacuna 22 by identifying the last data unit $X_m$ received before the interruption in the data. It then identifies the first data unit $X_{m+k}$ received after resumption of data acquisition. The lacuna detector 26 then formulates a request for omitted data identifying data units $X_m$ to $X_{m+k-1}$ and provides that request to the internode communicator 32 to send (48) it to a second node 10B. In some implementations, each node is responsible for identifying (44) an interruption in receiving the data feed without the aid of other nodes. In other implementations, the step (44) of identifying an interruption in receiving the data feed can be facilitated by other nodes in the network. For example, a master node may be configured to periodically examine the data storage devices used by other nodes and detect data lacunas in their respective sets of stored data units. The master node may then communicate with the nodes to assist in their identification of the interruption and/or their identification of their data lacunas. If the nodes are servers, the master node may be a server that has been elected as a leader in a distributed consensus algorithm run on a group of servers, for example.

Eventually, the first node 10A receives some or all of the omitted data from either the second node 10B or another node 10Z (e.g., if the second node 10B is also missing any of the data units). The node 10A uses omitted data to repair (50) the data lacuna 22. The omitted data is provided to a lacuna repair unit 36 that writes the omitted data into the data lacuna 22 thus reducing the extent of the data lacuna 22 or in some cases, depending on the extent of omitted data provided, eliminating the data lacuna 22 altogether. The node 10A then returns to normal operation (42).

Figure 5:
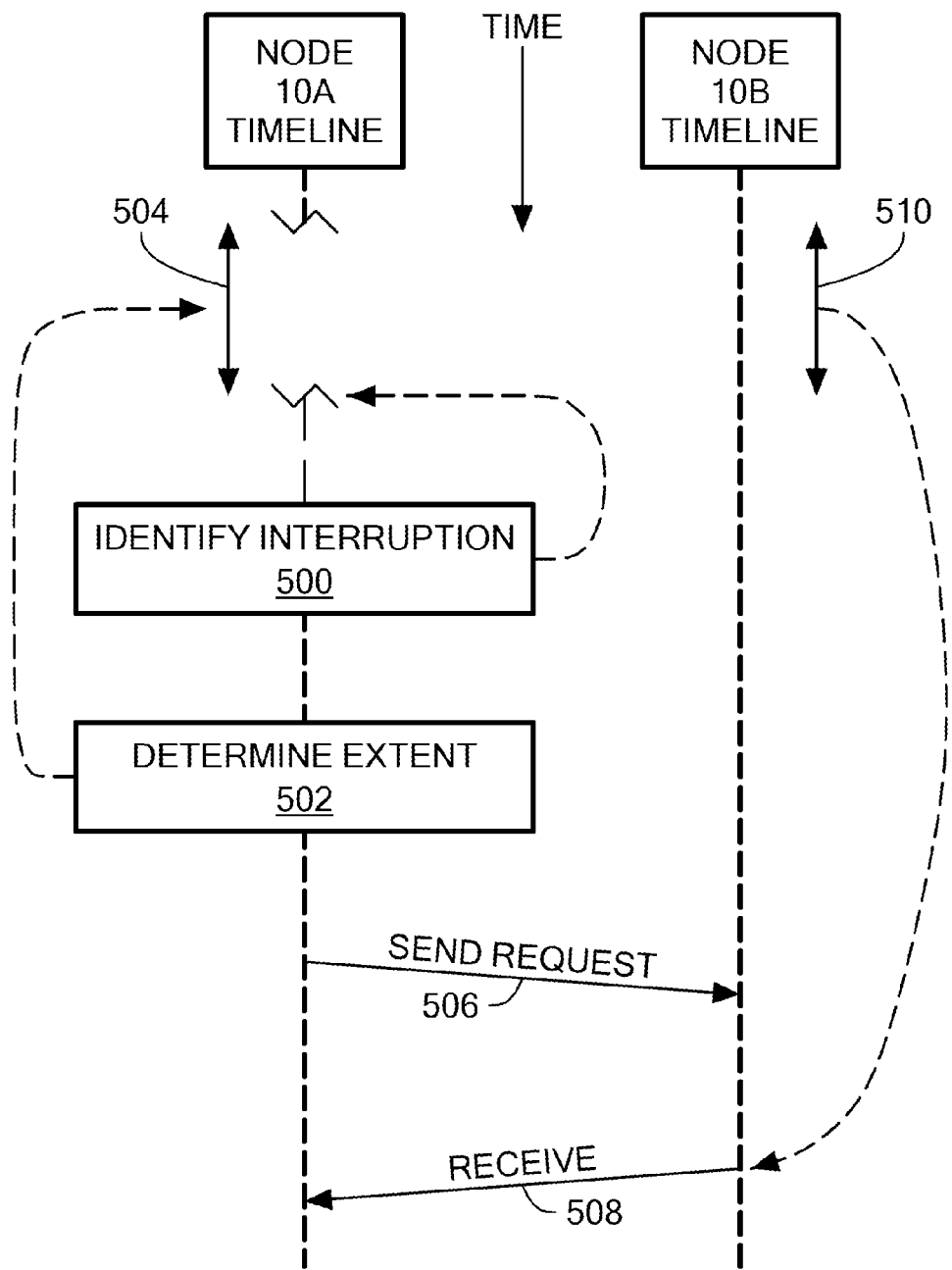
FIG. 5 is a pair of timelines showing communication between a pair of nodes.

FIG. 5 shows timelines for actions and communication between the node 10A and the node 10B in an example scenario in which a data lacuna is identified and repaired. Each node receives a data feed as time increases from the top to the bottom of the timelines. The node 10A identifies (500) an interruption in the data feed after reception of the data units has resumed. The node 10A determines (502) an extent of a data lacuna 504. The node 10A sends (506) a request, and a short time later receives (508) from node 10B saved results corresponding to a span of data units 510 that would have been received and processed if the data lacuna 504 had not occurred in the data units received by node 10A.

The data feed management approach described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for managing data units broadcast from a data feed without requiring re-transmission by a source of the data feed, the method including:
   at a first node in a network, receiving at least a portion of a data feed including a plurality of data units, and saving a first result based on a first data unit from the data feed at the first node;
   at a second node in the network, receiving at least a portion of the data feed, and saving results based on data from the data feed at the second node, the results including the first result, a second result, and a third result, the second result being based on a second data unit, and the third result being based on a third data unit, wherein the second data unit is received after the first data unit and before the third data unit;
   identifying an interruption in receiving the data feed at the first node;
   determining an extent of a data lacuna extending between a last data unit received by the first node prior to the interruption and a first data unit received by the first node after the interruption; and
   sending a request from the first node for results saved by the second node, the results saved by the second node corresponding to the data lacuna;
   wherein determining an extent of a data lacuna includes
      at the first node, after the interruption, receiving the third data unit,
      at the first node, identifying that the first data unit is the last data unit received prior to the interruption, and
      at the first node, identifying existence of a data lacuna extending between the first data unit and the third data unit.

2. The method of claim 1, further including, prior to identifying the interruption, processing data units in the data feed at the first node to save results corresponding to the data units at the first node, and processing data units in the data feed at the second node to save results corresponding to the data units at the second node.

3. The method of claim 2, wherein processing a data unit to save a result corresponding to the data unit includes durably storing a representation of the data unit.

4. The method of claim 3, wherein the representation of the first data unit is an exact copy of the first data unit.

5. The method of claim 3, wherein the representation of the first data unit is a compressed representation of the first data unit.

6. The method of claim 1, further including, at the first node, receiving the results saved by the second node corresponding to the data lacuna, and saving the results at the first node.

7. The method of claim 1, further including, at the first node, receiving the results saved by the second node corresponding to the data lacuna, and saving the results, including the second result, at the first node.

8. The method of claim 1, further including, prior to sending a request from the first node, selecting the second node from among a plurality of nodes, all of which are being streamed the data feed.

9. The method of claim 1, further including receiving a request from a client in communication with the first node.

10. The method of claim 9, wherein the request from the client identifies one or more data units associated with the request.

11. The method of claim 10, further including sending the request from the first node for results saved by the second node in response to determining that at least one of the data units identified by the request from the client is in the data lacuna.

12. The method of claim 9, further including, after receiving the results saved by the second node, responding to the request from the client.

13. The method of claim 9, further including responding to the request from the client to redirect the request to the second node.

14. Software stored in a non-transitory form on a computer-readable medium, for managing data units broadcast from a data feed without requiring re-transmission by a source of the data feed, the software including instructions for:
   causing a first node in a network to receive at least a portion of a data feed including a plurality of data units, and save a first result based on a first data unit from the data feed at the first node;
   causing a second node in the network to receive at least a portion of the data feed, and save results based on data from the data feed at the second node, the results including the first result, a second result, and a third result, the second result being based on a second data unit, and the third result being based on a third data unit, wherein the second data unit is received after the first data unit and before the third data unit;
   causing the first node to identify an interruption in receiving the data feed;
   causing the first node to determine an extent of a data lacuna extending between a last data unit received by the first node prior to the interruption and a first data unit received by the first node after the interruption; and
   causing the first node to send, to the second node that has also been receiving at least a portion of the data feed, a request for results saved by the second node, the results saved by the second node corresponding to the data lacuna;
   wherein determining an extent of a data lacuna includes
      at the first node, after the interruption, receiving the third data unit,
      at the first node, identifying that the first data unit is the last data unit received prior to the interruption, and
      at the first node, identifying existence of a data lacuna extending between the first data unit and the third data unit.

15. The software of claim 14, further including instructions for, prior to identifying the interruption, processing data units in the data feed at the first node to save results corresponding to the data units at the first node, and processing data units in the data feed at the second node to save results corresponding to the data units at the second node.

16. The software of claim 15, wherein processing a data unit to save a result corresponding to the data unit includes durably storing a representation of the data unit.

17. The software of claim 16, wherein the representation of the first data unit is an exact copy of the first data unit.

18. The software of claim 16, wherein the representation of the first data unit is a compressed representation of the first data unit.

19. The software of claim 14, further including instructions for, at the first node, receiving the results saved by the second node corresponding to the data lacuna, and saving the results at the first node.

20. The software of claim 14, further including instructions for, at the first node, receiving the results saved by the second node corresponding to the data lacuna, and saving the results, including the second result, at the first node.

21. The software of claim 14, further including instructions for, prior to sending a request from the first node, selecting the second node from among a plurality of nodes, all of which are being streamed the data feed.

22. The software of claim 14, further including instructions for receiving a request from a client in communication with the first node.

23. The software of claim 22, wherein the request from the client identifies one or more data units associated with the request.

24. The software of claim 23, further including instructions for sending the request from the first node for results saved by the second node in response to determining that at least one of the data units identified by the request from the client is in the data lacuna.

25. The software of claim 22, further including instructions for, after receiving the results saved by the second node, responding to the request from the client.

26. The software of claim 22, further including instructions for responding to the request from the client to redirect the request to the second node.

27. A system for managing data units broadcast from a data feed without requiring re-transmission by a source of the data feed, the system including:
    a plurality of nodes, with at least a first node and a second node each including:
        a network interface configured to receive at least a portion of a data feed including a plurality of data units, and
        processing circuitry configured to process the data feed, the processing including: identifying an interruption in receiving the data feed, determining an extent of a data lacuna extending between a last data unit received by the node prior to the interruption and a first data unit received by the node after the interruption, and sending a request to an other node for results saved by the other node, the results saved by the other node corresponding to the data lacuna;
    wherein the processing circuitry in the first node is configured to save a first result based on a first data unit from the data feed at the first node;
    wherein the processing circuitry in the second node is configured to save results based on data from the data feed at the second node, the results including the first result, a second result, and a third result, the second result being based on a second data unit, and the third result being based on a third data unit, wherein the second data unit is received after the first data unit and before the third data unit; and
    wherein determining an extent of a data lacuna includes
        at the first node, after the interruption, receiving the third data unit,
        at the first node, identifying that the first data unit is the last data unit received prior to the interruption, and
        at the first node, identifying existence of a data lacuna extending between the first data unit and the third data unit.

28. The system of claim 27, wherein the processing circuitry is further configured to, prior to identifying the interruption, process data units in the data feed at the first node to save results corresponding to the data units at the first node, and process data units in the data feed at the second node to save results corresponding to the data units at the second node.

29. The system of claim 28, wherein processing a data unit to save a result corresponding to the data unit includes durably storing a representation of the data unit.

30. The system of claim 29, wherein the representation of the first data unit is an exact copy of the first data unit.

31. The system of claim 29, wherein the representation of the first data unit is a compressed representation of the first data unit.

32. The system of claim 27, wherein the processing circuitry is further configured to, at the first node, receive the results saved by the second node corresponding to the data lacuna, and save the results at the first node.

33. The system of claim 27, wherein the processing circuitry is further configured to, at the first node, receive the results saved by the second node corresponding to the data lacuna, and save the results, including the second result, at the first node.

34. The system of claim 27, wherein the processing circuitry is further configured to, prior to sending a request from the first node, select the second node from among a plurality of nodes, all of which are being streamed the data feed.

35. The system of claim 27, wherein the processing circuitry is further configured to receive a request from a client in communication with the first node.

36. The system of claim 35, wherein the request from the client identifies one or more data units associated with the request.

37. The system of claim 36, wherein the processing circuitry is further configured to send the request from the first node for results saved by the second node in response to determining that at least one of the data units identified by the request from the client is in the data lacuna.

38. The system of claim 35, wherein the processing circuitry is further configured to, after receiving the results saved by the second node, respond to the request from the client.

39. The system of claim 35, wherein the processing circuitry is further configured to respond to the request from the client to redirect the request to the second node.

40. A system for managing data units broadcast from a data feed without requiring re-transmission by a source of the data feed, the system including:
    a plurality of nodes, with at least a first node and a second node each including:
        means for receiving at least a portion of a data feed including a plurality of data units, and
        means for processing the data feed, the processing including: identifying an interruption in receiving the data feed, determining an extent of a data lacuna extending between a last data unit received by the node prior to the interruption and a first data unit received by the node after the interruption, and sending a request to an other node for results saved by the other node, the results saved by the other node corresponding to the data lacuna;

wherein the first node includes means for saving a first result based on a first data unit from the data feed at the first node;

wherein the second node includes means for saving results based on data from the data feed at the second node, the results including the first result, a second result, and a third result, the second result being based on a second data unit, and the third result being based on a third data unit, wherein the second data unit is received after the first data unit and before the third data unit; and wherein determining an extent of a data lacuna includes
- at the first node, after the interruption, receiving the third data unit,
- at the first node, identifying that the first data unit is the last data unit received prior to the interruption, and
- at the first node, identifying existence of a data lacuna extending between the first data unit and the third data unit.

* * * * *